(12) United States Patent
Li et al.

(10) Patent No.: US 8,255,215 B2
(45) Date of Patent: Aug. 28, 2012

(54) METHOD AND APPARATUS FOR LOCATING SPEECH KEYWORD AND SPEECH RECOGNITION SYSTEM

(75) Inventors: Fengqin Li, Shanghai (CN); Yadong Wu, Shanghai (CN); Qinqtao Yang, Jiangsu (CN); Chen Chen, Shanghai (CN)

(73) Assignee: Sharp Kabushiki Kaisha, Osaka (JP)

( * ) Notice: Subject to any disclaimer, the term of this patent is extended or adjusted under 35 U.S.C. 154(b) by 734 days.

(21) Appl. No.: 12/443,063

(22) PCT Filed: Sep. 27, 2007

(86) PCT No.: PCT/JP2007/069409
§ 371 (c)(1),
(2), (4) Date: Mar. 26, 2009

(87) PCT Pub. No.: WO2008/044582
PCT Pub. Date: Apr. 17, 2008

(65) Prior Publication Data
US 2010/0094626 A1    Apr. 15, 2010

(30) Foreign Application Priority Data

Sep. 27, 2006 (CN) .......................... 2006 1 0152758

(51) Int. Cl.
G10L 15/26 (2006.01)
G10L 19/14 (2006.01)
G10L 15/04 (2006.01)
(52) U.S. Cl. .......................... 704/235; 704/224; 704/251
(58) Field of Classification Search .................. None
See application file for complete search history.

(56) References Cited

U.S. PATENT DOCUMENTS
5,003,601 A * 3/1991 Watari et al. .................. 704/255
(Continued)

FOREIGN PATENT DOCUMENTS
CN    1455389 A    11/2003
(Continued)

OTHER PUBLICATIONS
Wu et al., "Speaker Recognition based on Feature Space Trace", In EUROSPEECH-2001, Sep. 2001.*
(Continued)

*Primary Examiner* — Brian Albertalli
(74) *Attorney, Agent, or Firm* — Birch, Stewart, Kolasch & Birch, LLP (57) ABSTRACT

It is an object of the present invention to provide a method and apparatus for locating a keyword of a speech and a speech recognition system. The method includes the steps of: by extracting feature parameters from frames constituting the recognition target speech, forming a feature parameter vector sequence that represents the recognition target speech; by normalizing of the feature parameter vector sequence with use of a codebook containing a plurality of codebook vectors, obtaining a feature trace of the recognition target speech in a vector space; and specifying the position of a keyword by matching prestored keyword template traces with the feature trace. According to the present invention, a keyword template trace and a feature space trace of a recognition target speech are drawn in accordance with an identical codebook. This causes resampling to be unnecessary in performing linear movement matching of speech wave frames having similar phonological feature structures. This makes it possible to improve the speed of location and recognition while ensuring the precision of recognition.

14 Claims, 7 Drawing Sheets

U.S. PATENT DOCUMENTS

| | | | |
|---|---|---|---|
| 5,199,077 A | | 3/1993 | Wilcox et al. |
| 5,355,432 A | * | 10/1994 | Tanaka et al. ............ 704/234 |
| 5,561,722 A | * | 10/1996 | Watari et al. ............. 382/209 |
| 5,649,057 A | * | 7/1997 | Lee et al. ................. 704/256 |
| 5,754,681 A | | 5/1998 | Watanabe et al. |
| 5,806,029 A | * | 9/1998 | Buhrke et al. ............ 704/244 |
| 5,822,729 A | * | 10/1998 | Glass ....................... 704/255 |
| 5,953,699 A | | 9/1999 | Takagi |
| 6,061,652 A | * | 5/2000 | Tsuboka et al. .......... 704/245 |
| 6,236,964 B1 | * | 5/2001 | Tamura et al. ............ 704/254 |
| 6,401,064 B1 | * | 6/2002 | Saul .......................... 704/240 |
| 6,453,293 B1 | * | 9/2002 | Kammerer ................ 704/254 |
| 2002/0143540 A1 | | 10/2002 | Malayath et al. |
| 2004/0006470 A1 | | 1/2004 | Kobayashi |

FOREIGN PATENT DOCUMENTS

| | | |
|---|---|---|
| EP | 1 557 821 A2 | 7/2005 |
| JP | 4-343398 A | 11/1992 |
| JP | 5-204394 A | 8/1993 |
| JP | 6-324699 A | 11/1994 |
| JP | 8-106295 A | 4/1996 |
| JP | 10-133688 A | 5/1998 |
| JP | 2004-37798 A | 2/2004 |
| JP | 2004-530155 A | 9/2004 |

OTHER PUBLICATIONS

Li et al., "Multi-Keyword Spotting Based on Speech Feature Space Trace Matching", Proceedings of the Third International Conference on Machine Learning and Cybernetics, Aug. 2004.*

Sakoe et al., "Dynamic Programming Algorithm Optimization for Spoken Word Recognition", IEEE Transactions on Acoustics, Speech, and Signal Processing, vol. ASSP-26, No. 1, Feb. 1978.*

Fang et al., "Application of Variable Frame Rate Techniques to Speech Recognition", Journal of Shanghai Jiaotong University, pp. 42-44, vol. 32, No. 8, 1998.

Wu et al., "Keyword spotting method based on speech feature space trace matching", Proceedings of the Second International Conference on Machine Learning and Cybernetics, pp. 3188-3192, 2003.

Matsuoka, T., "Speaker-independent speech recognition", Institute of Electronics, Information, and Communication Engineers, Technical Report, pp. 25-32, 1994.

Search Report for corresponding European Patent Application No. 07829148.1 dated Feb. 21, 2012.

Wu Xuhui, Wu Yadong (Department of Computer Science&Engineering,Shanghai Jiaotong University,Shanghai 200030); "A Keyword Spotting Method Based on Speech Feature Space Trace Matching";Computer Engineering and Applications; 2003-36 (Dec. 31, 2003).

* cited by examiner

$V_i$: FEATURE PARAMETER VECTOR
● : FEATURE POINT IN FEATURE SPACE($V_i$)

FIG. 3(b)

FEATURE POINT ($V_i$)

FIG. 3(c)

$F_j$: FEATURE VECTOR AFTER NORMALIZATION
△ : FEATURE POINT IN FEATURE SPACE($F_j$)

FIG. 3(d)

FEATURE POINT AFTER NORMALIZATION

METHOD AND APPARATUS FOR LOCATING SPEECH KEYWORD AND SPEECH RECOGNITION SYSTEM

TECHNICAL FIELD

The present invention relates to methods and apparatuses for locating speech keywords and to speech recognition systems. More specifically, the present invention relates to a method and apparatus for locating a speech keyword by speech feature space trace matching and to a speech recognition system in which the apparatus is used. The present invention makes it possible to improve the speed of location and recognition while ensuring the precision of recognition.

BACKGROUND ART

In recent years, an increasing number of information terminal apparatuses such as PCs (personal computers), PDAs (personal digital assistants), mobile phones, and remote controllers have been provided with a speech input function. This has enabled users to input commands or keywords by their speeches. That is, the use of such an information terminal apparatus makes it possible to identify, by an unknown speech inputted by a user, a keyword that the user wishes to input. It is one of the important issues in the field of speech recognition techniques to accurately and quickly specify the position of a keyword.

Non-patent Document 1 proposes a variable frame rate technique, applied to speech recognition, which has as an object to quickly identify an input speech by eliminating speech wave frames having very similar features. In Non-patent Document 1, speech features are combined by defining an appropriate threshold value by mathematical derivation, and a speech feature vector sequence including a phonological feature structure is obtained. However, the setting of such a threshold value is very difficult, and directly affects the precision of recognition. Further, the method proposed in Non-patent Document 1 uses nonlinear matching, and therefore requires a large amount of calculation in a process of identifying a keyword.

In Non-patent Document 2, speech features are combined by calculating distances between vectors in a feature vector space and by defining an appropriate threshold value, and a speech feature vector sequence including a phonological feature structure is obtained. However, such a combination is targeted at a speech of a specific speaker. Therefore, representative feature points representing an identical phonological feature include feature information on a large number of speakers, and variations are large. This makes it necessary to perform resampling of a speech trace in a subsequent matching process. This causes an increase in complexity of recognition. Further, Non-patent Document 2 does not provide a good solution for problems with resampling techniques. This makes it difficult to ensure the precision of recognition. Furthermore, the amount of calculation required to calculate the distances between vectors are very large, and the combination of features makes it very difficult to set an appropriate threshold value. Further, the setting of such a threshold value directly affects the correctness or incorrectness of an estimation of a speech trace including a phonological feature structure. These factors prevent an increase in the degree of accuracy of subsequent matching based on a speech feature space trace.

Further, a technique disclosed in Non-patent Document 2 with respect to the establishment of a keyword template also uses the combining method, and estimates a keyword speech feature space trace. The content of a keyword is designed for a specific recognition task region. Specifically, the keyword speech trace is not generated by a learning corpus of plural application regions; therefore, it is difficult to directly apply the keyword speech trace to an unspecified speaker region. In cases where the task region is changed, it is necessary to produce a new keyword speech template. Therefore, in the technique disclosed in Non-patent Document 2, the keyword speech trace template does not have general versatility, and therefore has a difficulty in actual application.

According to the foregoing problems, the methods proposed by Non-patent Documents 1 and 2 cannot be actually applied to information terminal apparatuses. This makes it necessary to rapidly locate a keyword in an input speech and to reduce the amount of calculation.

[Non-patent Document 1] "Application of Variable Frame Rate Techniques to Speech Recognition", Sun, F., Hu, G., and Yu, X., Journal of Shanghai Jiaotong University, Vol. 32, No. 8, August 1998

[Non-patent Document 2] "Keyword Spotting Method Based on Speech Feature Trace Matching", Wu, Y. and Liu, B., Proceedings of the Second Conference on Machine Learning and Cybernetics, Nov. 2 to 5, 2003

DISCLOSURE OF INVENTION

The present invention has been made in view of the foregoing problems, and it is an object of the present invention to provide a method and apparatus for locating a speech keyword by speech feature space trace matching and a speech recognition system in which the apparatus is used. This makes it possible to improve the speed of location and recognition while ensuring the precision of recognition.

A method according to the present invention for locating a keyword of a recognition target speech includes the steps of: by extracting feature parameters from frames constituting the recognition target speech, forming a feature parameter vector sequence that represents the recognition target speech; by normalizing of the feature parameter vector sequence with use of a codebook containing a plurality of codebook vectors, obtaining a feature trace of the recognition target speech in a vector space; and specifying the position of a keyword by matching prestored keyword template traces with the feature trace.

Further, according to an embodiment of the present invention, the normalizing step includes the step of displaying the feature trace by extracting representative feature parameter vectors from the feature parameter vector sequence.

Further, according to an embodiment of the present invention, the step of extracting the representative feature parameter vectors includes the steps of: searching the codebook for codebook vectors that are closest to the feature parameter vectors; displaying the feature parameter vectors with use of numbers of the codebook vectors thus found; and displaying the feature parameters by combining feature parameter vectors represented by continuously identical codebook vectors.

Further, according to an embodiment of the present invention, the matching step includes the steps of: by using each of the keyword template traces, sequentially calculating, with respect to each trace frame, distances between (i) template feature vectors that represent the keyword template trace and (ii) the representative feature parameter vectors that represent the feature trace, the trace frame representing the feature trace on a time axis; specifying a minimum value of the distances; and specifying, as the position of the keyword, a position that a keyword template trace corresponding to the minimum value occupies in the vector space.

Further, according to an embodiment of the present invention, the feature parameter vectors include at least one parameter selected from the group consisting of a cepstral parameter, an energy value of the cepstral parameter, a first derivative of the cepstral parameter, a second derivative of the cepstral parameter, a first derivative of the energy value, and a second derivative of the energy value.

Further, according to an embodiment of the present invention, each of the distances is displayed with use of a codebook vector distance, the code book vector distance being a distance between any two of the codebook vectors.

Further, according to an embodiment of the present invention, the codebook vector distance is stored in advance in a matrix form.

Further, according to an embodiment of the present invention, the keyword template traces are generated in accordance with the codebook vectors.

Further, according to an embodiment of the present invention, each of the keyword template traces is obtained by the steps of: obtaining a phonemic name of each syllable of the keyword in accordance with correspondence between syllables and phonemic models; obtaining each state of the keyword in accordance with correspondence between the phonemic models and states and forming a state vector; displaying a codebook vector sequence number of a phonemic model with use of a number corresponding to the state vector contained in the codebook; combining codebook vector sequence numbers of phonemic models represented by continuously identical codebook vector numbers; and obtaining the keyword template trace after concatenating the codebook vector sequence numbers.

Further, according to an embodiment of the present invention, each of the keyword template traces is obtained by the steps of: forming a parameter vector sequence of an input keyword by dividing a speech wave of the input keyword into speech wave frames and then by extracting feature parameter vectors from the speech wave frames; and by using the codebook to normalize the feature parameter vector sequence, forming a template vector sequence that represents the keyword template trace.

Further, according to an embodiment of the present invention, the codebook is obtained by the steps of: extracting, from a phonetic model based on a hidden Markov model, statistical parameters that represent states of each phonemic model and then forming a feature vector of each of the states; and forming each of the codebook vectors of the codebook by displaying the feature vector of each of the states by number.

Further, according to an embodiment of the present invention, the phonemic model is generated by a learning corpus of a plurality of application regions.

Further, an apparatus according to the present invention for locating a keyword of a recognition target speech includes: a feature extracting device for, by extracting feature parameters from frames constituting the recognition target speech, forming a feature parameter vector sequence that represents the recognition target speech; a normalizing device for, by normalizing of the feature parameter vector sequence with use of a codebook containing a plurality of codebook vectors, obtaining a feature trace of the recognition target speech in a vector space; and a matching device for specifying the position of a keyword by matching prestored keyword template traces with the feature trace.

Further, according to an embodiment of the present invention, the normalizing device displays the feature trace by extracting representative feature parameter vectors from the feature parameter vector sequence.

Further, according to an embodiment of the present invention, the normalizing device searches the codebook for codebook vectors that are closest to the feature parameter vectors, displays the feature parameter vectors with use of numbers of the codebook vectors thus found, and displays the feature parameters by combining feature parameter vectors represented by continuously identical codebook vectors.

Further, according to an embodiment of the present invention, the matching device uses each of the keyword template traces to sequentially calculate, with respect to each trace frame, distances between (i) template feature vectors that represent the keyword template trace and (ii) the representative feature parameter vectors that represent the feature trace, the trace frame representing the feature trace on a time axis; specifies a minimum value of the distances; and specifies, as the position of the keyword, a position that a keyword template trace corresponding to the minimum value occupies in the vector space.

A speech recognition system according to the present invention includes: an apparatus as described above; and a speech recognition device for recognizing the content of a keyword in accordance with the position of the keyword, the keyword being specified by the apparatus.

Further, according to an embodiment of the present invention, the speech recognition device performs recognition in accordance with a hidden Markov model.

With use of the method and apparatus of the present invention, a keyword template trace and a feature space trace of a recognition target speech are represented in accordance with an identical codebook. This causes resampling to be unnecessary in performing linear movement matching of speech wave frames having similar phonological feature structures. This makes it possible to reduce the amount of calculation and to improve the speed of location and recognition.

Further, the distance between a feature space trace of a recognition target speech and a keyword template trace is represented with use of a prestored codebook vector distance. This makes it possible to obtain a matching result by a searching method in a matching process in calculating the distance between the recognized speech and the template speech. This makes it possible to further reduce the amount of calculation necessary for matching and to improve the speed of location and recognition.

Further, the present invention is such that a phonemic model necessary for forming a codebook is formed by a learning corpus of plural application ranges, and therefore has general versatility. That is, the present invention can be applied to different regions.

Further, a combination of a method and apparatus of the present invention for locating a keyword and a conventional HMM (hidden Markov model) speech recognition system makes it possible to avoid a difficulty of an HMM recognition method in establishing out-of-vocabulary word modeling, thereby making it possible to further improve the precision of recognition.

BRIEF DESCRIPTION OF DRAWINGS

Additional objects, features, and strengths of the present invention will be made clear by the description below. Further, the advantages of the present invention will be evident from the following explanation in reference to the drawings.

FIGS. 2(*a*) and 2(*b*) are diagrams for explaining a process according to an embodiment of the present invention of generating a state feature codebook and a process according to an embodiment of the present invention of generating a codebook vector distance matrix.

FIGS. 3(a) through 3(d) are diagrams explaining a process according to an embodiment of the present invention of normalizing a speech feature space trace.

FIGS. 4(a) through 4(c) are diagrams explaining a process according to an embodiment of the present invention of generating a speech feature space trace.

FIGS. 5(a) through 5(c) are diagrams showing the principle of a process according to an embodiment of the present invention of locating a keyword in an input speech by speech feature space trace matching.

FIGS. 6(a) and 6(b) are diagrams explaining a process according to an embodiment of the present invention of generating a keyword template.

BEST MODE FOR CARRYING OUT THE INVENTION

One embodiment of the present invention will be described below with reference to the drawings.

The same reference numerals given in different drawings indicate the same or similar components. For the purpose of convenience, the following description omits an explanation of well-known functions and structures in order to avoid obscuring the gist of the present invention.

Figure 1:
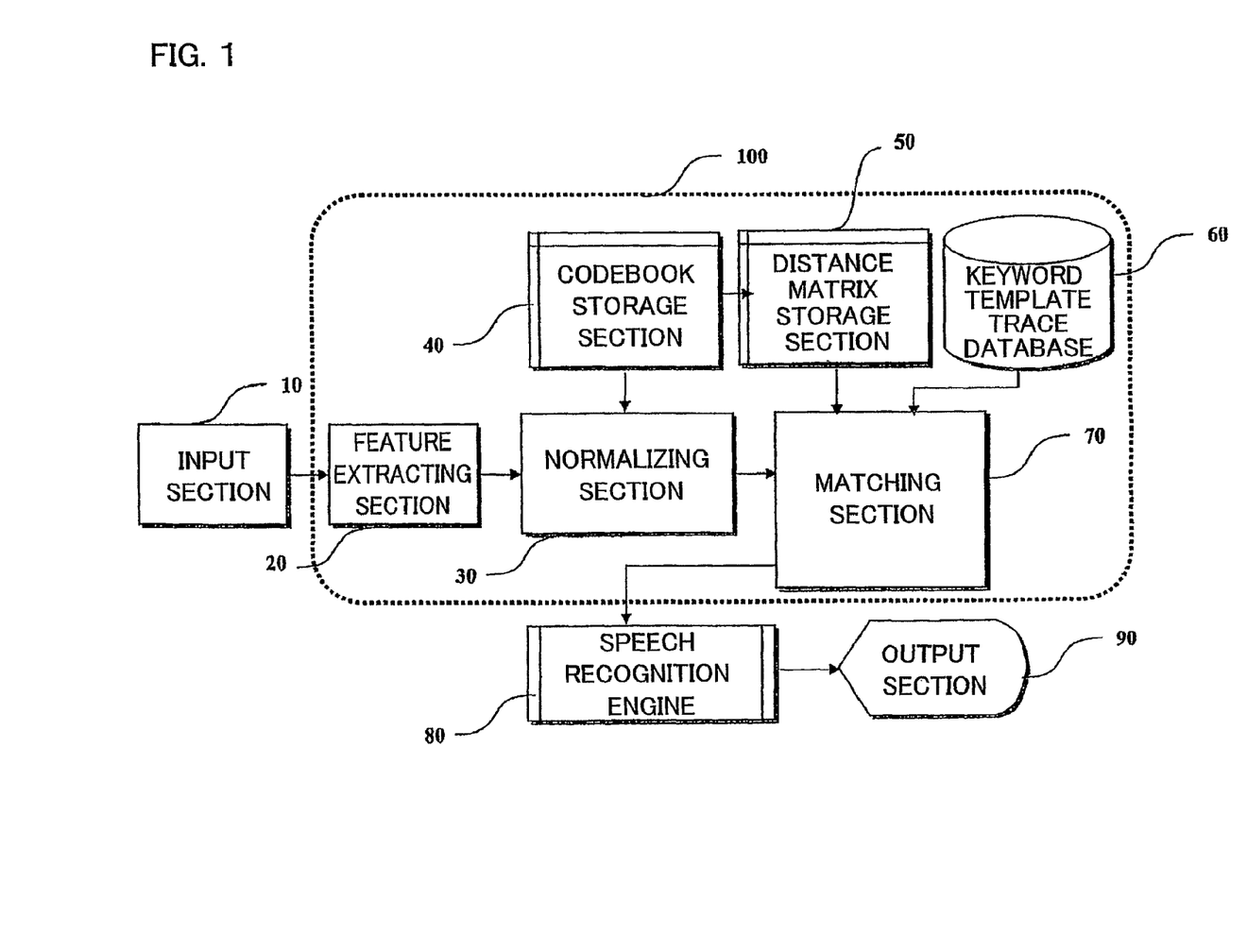
FIG. 1 is a block diagram showing a structure of a speech recognition system according to an embodiment of the present invention.

FIG. 1 is a block diagram showing a structure of a speech recognition system according to an embodiment of the present invention. As shown in FIG. 1, the speech recognition system of the present invention includes: an input section 10, such as a microphone, for inputting a recognition target speech; a keyword locating apparatus 100, connected to the input section 10, which is used for specifying the position of a keyword of the recognition target speech; a speech recognition engine 80, connected to the keyword locating apparatus 100, which is used for identifying the keyword in accordance with the keyword's position specified by the keyword locating apparatus 100; and an output section 90 for outputting a result of the recognition performed by the speech recognition engine 80.

As shown in FIG. 1, the keyword positioning apparatus 100 according to an embodiment of the present invention includes: a feature extracting section 20, connected to the input section 10, which is used for extracting feature parameters of speech frames divided from each other; a codebook storage section 40, such as a magnetic memory or a semiconductor memory, for storing a codebook subjected to vector quantization; a distance matrix storage section 50, such as a magnetic memory or a semiconductor memory, for storing distances between code vectors contained in the codebook in a matrix form; a normalizing section 30 for obtaining a feature trace of a vector space by normalizing, in accordance with the codebook stored in the codebook storage section 40, parameter vectors formed by the feature parameters extracted by the feature extracting section 20; a keyword template trace database 60 for storing a trace, contained in the vector space, in which a user is interested; and a matching section 70 for specifying the position of a keyword by matching the keyword template trace with the feature trace of the recognition target speech in accordance with the distances stored in the distance matrix storage section 50 and the keyword template stored in the keyword template trace database 60.

In the speech recognition system according to an embodiment of the present invention, a recognition target speech or a template speech is inputted with use of a speech input section 10 such as a microphone. Alternatively, a speech may be inputted by directly using speech data or a speech file stored in advance in a storage device.

The feature extracting section 20 extracts features of frames of input speech data in accordance with a predetermined configuration of parameters such as from, sampling frequency, code bit number, type of audio channel, frame length, frame shift, and type of feature parameter, thereby yielding a sequences of feature parameter vectors $\{V_1, V_2, \ldots V_N\}$ of the input speech. Note that each vector $V_i$ is a feature vector (i=1, ..., N) having a predetermined number of dimensions K. In the present embodiment, the feature extracting section 20 extracts feature parameters respectively, corresponding to speech wave frames into which an input speech has been divided, and then forms feature parameter vectors. The feature parameters thus extracted include a cepstral parameter, an energy value of the cepstral parameter, a first derivative of the cepstral parameter, a second derivative of the cepstral parameter, a first derivative of the energy value, and a second derivative of the energy value. Examples of the aforementioned cepstral parameters include cepstral parameters of 12-dimensional FET (fast Fourier transform). In this case, the number of dimensions K of the feature parameter vectors is 39. See below for a specific description of the parameters:

Cepstral parameter: $C_1, C_2, \ldots, C_{12}$;
Energy value: E;
First derivative of the cepstral parameter: $dC_1, dC_2, \ldots, dC_{12}$;
Second derivative of the cepstral parameter: $DC_1, DC_2, \ldots, DC_{12}$;
First derivative of the energy value: dE; and
Second derivative of the energy value: DE.

In the present embodiment, the sequence of feature parameter vectors $\{V_1, V_2, \ldots V_N\}$ extracted by the feature extracting section 20 is sent to the normalizing section 30 of the keyword locating apparatus 100. The normalizing section 30 estimates a trace of the input speech in a vector space, and normalizes the estimated trace for the purpose of a subsequent matching process. The normalizing section 30 performs, with use of the "codebook" stored in advance in the codebook storage section 40, vector quantization of each of the feature parameter vectors contained in the sequence of feature parameter vectors. Then, the normalizing section 30 outputs a feature trace, represented by the sequence of feature parameter vectors subjected to vector quantization, which is included in the vector space of the input speech. Note that the codebook storage section 40 contains reference vectors of feature parameters generated with use of an HMM method. The reference vectors are used to quantize a target of vector quantization.

Further, the distance matrix storage section 50 contains distances between any two of the plurality of reference vectors (i.e., codebook vectors) stored in the codebook storage section 40. The distances between the codebook vectors are used to represent the degree of similarity between a feature parameter vector of a template speech and a feature vector of a recognition target speech in a vector space.

Prestored in the keyword template trace database 60 is a feature trace of a keyword of a user's interest (i.e., a template keyword) in a vector space. The feature trace is represented by a sequence of feature parameter vectors subjected to vector quantization. The feature trace is used for matching with the feature trace of the input recognition target speech.

The normalizing section 30 provides the matching section 70 with a sequence of normalized feature vectors of an input speech. The matching section 70 takes template traces of keywords one after another from the keyword template trace database 60, moves the template traces along a trace formed in the vector space by points indicated by the sequence of normalized feature vectors (the trace representing a feature trace of a recognition target speech in a vector space), and performs a matching operation with respect to trace frames one after another. Note that the trace frames are normalized speech frames, i.e., speech waves respectively corresponding feature vectors constituting a normalized trace. In the process of moving the trace frames one by one, the matching section 70 calculates, in accordance with the codebook vector distances stored in the distance matrix storage section 50, distances between the keyword template traces and the feature trace of the recognition target speech in the vector space by a calculation for figuring out a sum. After completion of all the trace matching, minimum distances are obtained by matching of the keyword template traces. Thereafter, the matching section 70 performs the aforementioned process with respect to each stored keyword, thereby yielding minimum distances between the keyword template traces and the feature trace of the recognition target speech in the vector space.

Then, the matching section 70 determines, by comparison, a minimum value of the minimum distances calculated with respect to the keyword template traces. Moreover, a keyword of a template trace corresponding to the minimum value is identified as a candidate keyword. In cases where high precision is not required, the matching section 70 may identify the candidate keyword directly as a final keyword.

Then, the matching section 70 reflects, on a speech wave frame corresponding to the time axis, the position of the candidate keyword on the vector space trace. This makes it possible to specify the position of the keyword in the recognition target speech.

As described above, the speech recognition engine 80 can directly use feature parameters extracted by the feature extracting section 20 from a recognition target speech that is in the position of a candidate keyword already located, and further performs recognition, thereby yielding a final result of the recognition, i.e., yielding the content of a keyword. The resulting candidate keyword can be referred to in determining the content of a final keyword.

Finally, the output section 90 outputs the content of the identified keyword in accordance with a result of the recognition performed by the speech recognition engine 80. For example, the output section 90 displays the identified keyword on a screen.

In the following, operation processes in each of the components will be specifically described with reference to FIGS. 2(a) through 7.

Figure 2A:
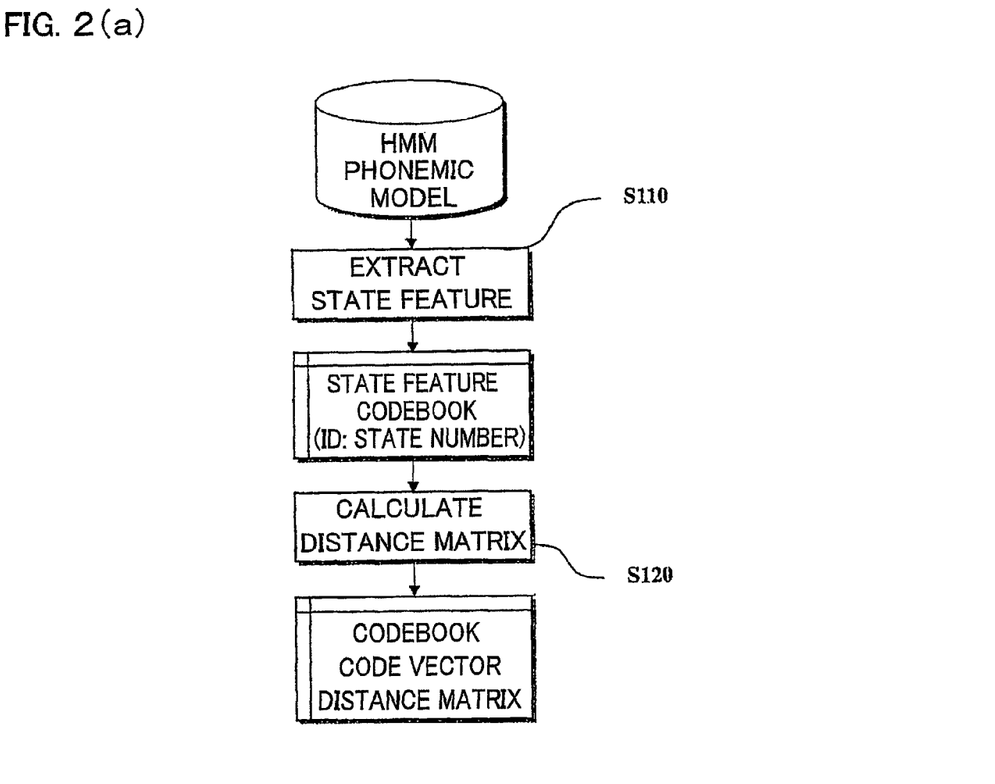
FIG. 2(a) is a flow chart showing a process of generating a codebook and a process of generating a codebook vector distance matrix.
Figure 2B:
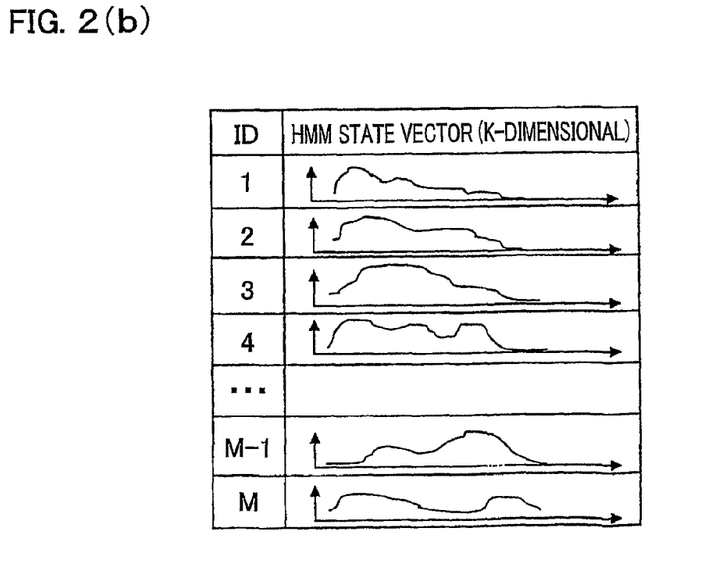
FIG. 2(b) is a diagram showing an embodiment explaining a state feature codebook.

FIGS. 2(a) and 2(b) are diagrams for explaining a process according to an embodiment of the present invention of generating a state feature codebook and a process according to an embodiment of the present invention of generating a codebook vector distance matrix. FIG. 2(a) is a flow chart showing a process of generating a codebook and a process of generating a codebook vector distance matrix. FIG. 2(b) is a diagram showing an embodiment explaining a state feature codebook.

The codebook is constituted by a group of reference vectors for use in vector quantization. In the present embodiment, the physical meaning of the codebook is to represent a state feature of an HMM acoustic model.

The codebook vector matrix stores, in the codebook, a two-dimensional data set that indicates distances between any two codebook vectors. The codebook and the codebook vector matrix are stored in advance in a memory such as ROM (read-only memory) or an HD (hard disk). The codebook and the codebook vector matrix can be respectively stored in separate memories, e.g., in the codebook storage section 40 and the distance matrix storage section 50. Alternatively, the codebook and the codebook vector matrix may be stored in different memory areas of a memory.

In the present embodiment, the codebook is generated in accordance with the HMM acoustic model. The following shows a specific process of generating the codebook.

(1) The HMM acoustic model is represented by an HMM model definition file (hmmdefs), and each phonemic model hmmdefs is obtained by a learning corpus of plural application ranges. The hmmdefs is constituted as follows:

```
~h "iz2"              //phonetic model name
    <BEGINHMM>
    <NUMSTATES>5     //five state numbers, three (2, 3,
and 4) of which are effective
    <STATE>2         //state number
    <NUMMIXES>6      //mixed   Gaussian    distribution
number
    <MIXTURE>1 1.250000e-001    //Gaussian   distribution
code and weighting
    <MEAN>39         //mean   parameter   of   Gaussian
distributions, 39-dimensional
7.702041e+000    6.226375e+000    ......    2.910257e-001
-8.276044e-002
    <VARIANCE>39     //covariance    parameter    of
Gaussian distribution, 39-dimensional
7.258195e+001    5.090110e+001    ......    3.907018e-001
2.388687e-002 ......
    <MIXTURE>6 1.250000e-001    //Gaussian   distribution
code and weighting
    <MEAN>39         //mean   parameter   of   Gaussian
distribution, 39-dimensional
8.864381e-001    5.187749e-001    ......    -2.090234e-001
-2.064035e-001
    <VARIANCE> 39    //covariance    parameter    of
Gaussian distribution, 39-dimensional
7.258195e+001    5.090110e+001    ......    3.907018e-001
2.388687e-002
```

-continued

```
    <STATE>3        //state number
    <NUMMIXES>6     //mixed Gaussian distribution
number, each Gaussian distribution is also represented by
two parameters (average parameter and covariance parameter)
......
    <STATE>4        //state number
    <NUMMIXES>6     //mixed Gaussian distribution
number, each Gaussian distribution is also represented by
two parameters (average parameter and covariance parameter)
......
    <TRANSP>5       //state transition probability
matrix
0.000000e+000      1.000000e+000      0.000000e+000
0.000000e+000 0.000000e+000
0.000000e+000      6.800905e-001      3.199094e-001
0.000000e+000 0.000000e+000
0.000000e+000      0.000000e+000      6.435547e-001
3.564453e-001 0.000000e+000
0.000000e+000      0.000000e+000      0.000000e+000
5.890240e-001 4.109760e-001
0.000000e+000      0.000000e+000      0.000000e+000
0.000000e+000 0.000000e+000
    <ENDHMM>.
```

(2) State features are extracted (S110); that is, feature parameters necessary for forming a codebook are extracted in accordance with a specific application. Stored in the HMM model definition file are statistical parameters that represent states of a phonemic model. The statistical parameters include a Gaussian distribution average value (39-dimensional), a covariance (39-dimensional), weighting, and a state transition matrix (which represents the probability of transitions between states of a phonemic model for each phoneme in five states, and therefore constitutes a 5×5 matrix). In the present embodiment, a mean parameter portion (12-dimensional CEP) of six Gaussian distributions that represent each state is extracted. Moreover, a mathematical average of these Gaussian distributions are found by weighting of each of the Gaussian distributions. The average value (12-dimensional CEP) obtained by the calculation serves as a codebook feature parameter that represents the state.

Thereafter, all the states are numbered. The states correspond respectively to uniquely specified ID numbers, e.g., 1, 2, . . . , M-1, M as shown in FIG. 2(b). These ID numbers represents feature vectors of the states, respectively, and are used for generating a feature codebook. The generated state feature codebook is stored in the codebook storage section 40. In the codebook, the number (M) of codebook vectors is defined by the size of the codebook.

In addition, a syllable-and-phonemic-model corresponding chart and a phonemic-model-and-state-name corresponding chart are obtained in the process of generating the HMM acoustic model. As described above, a state name is indicated by the number of each state of a codebook vector.

(3) By calculating distances between any two state feature vectors contained in the codebook, a distance matrix of M*M code vectors is obtained (S120). The distance matrix thus obtained is stored in the distance matrix storage section 50.

Figure 3A:
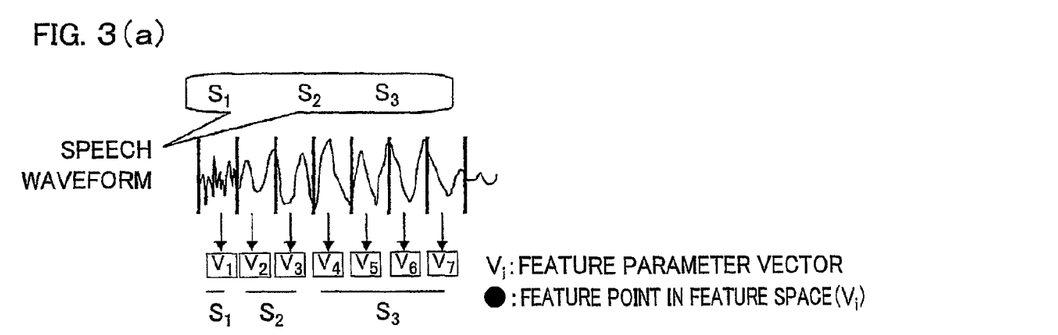
FIG. 3(a) is an explanatory diagram for obtaining feature vectors of an input speech.
Figure 3B:
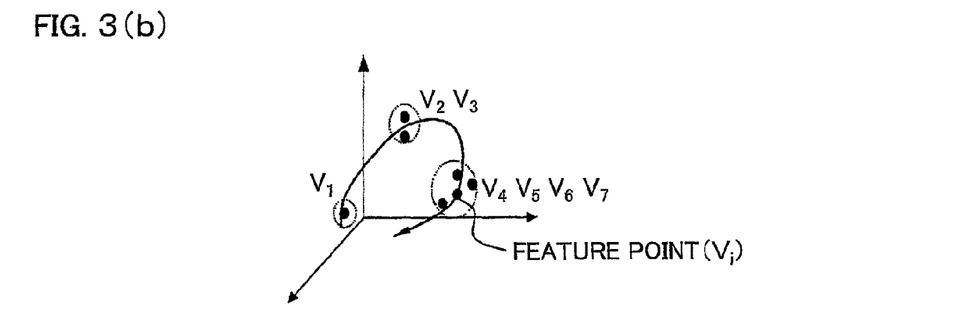
FIG. 3(b) is an explanatory diagram of feature vectors included in a vector space.
Figure 3C:
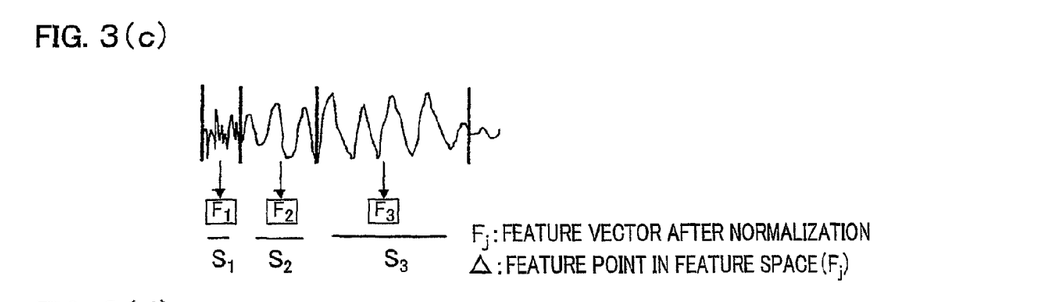
FIG. 3(c) is an explanatory diagram of feature vectors obtained after normalization.
Figure 3D:
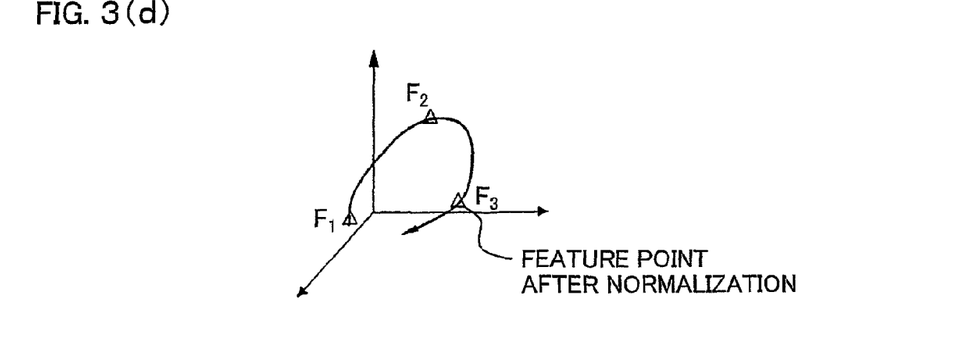
FIG. 3(d) is an explanatory diagram of normalized feature vectors included in the vector space.

FIGS. 3(a) through 3(d) are diagrams explaining a process according to an embodiment of the present invention of normalizing a speech feature space trace. FIG. 3(a) is an explanatory diagram for obtaining feature vectors of an input speech. FIG. 3(b) is an explanatory diagram of feature vectors included in a vector space. FIG. 3(c) is an explanatory diagram of feature vectors obtained after normalization. FIG. 3(d) is an explanatory diagram of normalized feature vectors included in the vector space.

According to Non-patent Document 2, time sequences X'(s) and R'(s) of new feature vectors extracted along their respective traces in accordance with the length s of similar traces with respect to time sequences X(tx) and R(tr) of two feature vectors of the pronunciation of an identical character (word) exhibit elastic invariance with respect to the time axis. Based on this basic principle, a feature space trace is normalized along the time axis with respect to a speech. A feature vector sequence subjected to time normalization can use a linear matching method. This makes it possible to significantly reduce the amount of calculation that is to be performed at the time of recognition.

In the present embodiment, the speech feature space trace is generated in accordance with the HMM acoustic model. First, as shown in FIG. 3(a), basic feature parameters of an input speech file are extracted.

For example, the continuous speech wave signal (waveform) indicative of the code sequence $S_1, S_2, S_3$ is divided into seven speech wave frames by a frame dividing process. By extracting feature parameters respectively corresponding to those seven speech wave frames, seven feature vectors $V_i$ ($1 \leq i \leq 7$) are obtained, so that a feature vector sequence is formed. Note that $V_i$ is a feature vector having a predetermined number (K) of dimensions.

The drawings show the K-dimensional space with use of a three-dimensional space. However, the drawings serve solely to clarify the object of the present invention. For a person skilled in the art, the present invention is not limited to a three-dimensional space.

As shown in FIG. 3(b), the sequence of feature vectors $V_i$ is expressed as coordinate points distributed on the K-dimensional space, and will be hereinafter referred to as "feature points". These feature points are arranged one after another in order of time ($V_1 \rightarrow V_2 \rightarrow V_3 \ldots \rightarrow V_6 \rightarrow V_7$), with the result that a trace can be obtained on the K-dimensional space. As shown in FIG. 3(b), the feature point $V_1$ is far from the other feature points, and the feature points $V_2$ and $V_3$ are close to each other. Further, the feature points $V_4$ to $V_7$ are already distributed so as to be concentrated within a range.

The normalization of a speech feature space trace depends on how accurately a feature space trace of a speech is estimated. In actual application, feature vectors contained in a speech are scattered on the time axis, and are influenced by a change in sound velocity and other fluctuating elements. This causes variations in wave spectrum characteristics among frames even within an identical phonological feature space area. This is reflected by the fact that a group of points adjacent to each other in a speech feature space includes a large number of feature points ($V_4, V_5, V_6, V_7$) with respect to a long phonological sound and includes a small number of feature points ($V_2, V_3$) with respect to a short phonological sound. As shown in FIG. 3(b), an area where identical phonological feature points are scattered is referred to as "semi-stability area", and an area where different phonological feature points are scattered is referred to as "non-stability area". For this reason, the phonological feature is expressed by using representative ones of the feature points (vectors) extracted from the group, a speech trace is estimated by using these representative feature vectors ($F_j$, j=1, 2, 3). As shown in FIG. 3(d), the feature vector $F_1$ indicates a representative feature point contained in the first group of feature points. Similarly, the feature vector $F_2$ indicates a representative feature point contained in the second group of feature points, and the feature vector $F_3$ indicates a representative feature point contained in the third group of feature points.

Further, as shown in FIG. 3(c), the feature parameter of the speech wave frame 1 is indicated by a normalized feature point (vector) $F_1$, and the feature parameters of the speech wave frames 2 and 3 are indicated by an identical feature point (vector) $F_2$. Moreover, the feature parameters of the speech wave frames 4 to 7 are indicated by another feature point (vector) $F_3$.

Further, in order to improve the accuracy of an estimation of a speech feature trace, it is necessary to consider the following points (1) and (2): (1) For the purpose of increasing the density of feature points in a non-stability area, a speech signal is divided by a shorter frame shift cycle. For example, while the conventional techniques use a frame shift cycle of 20 ms, the present embodiment uses a frame shift cycle of 10 ms or 8 ms; and (2) Feature points scattered within a semi-stability area are appropriately sorted out; that is, representative points are retained while the other feature points are deleted as unnecessary. According to a selectable sorting method, derivatives between feature points are calculated one after another, and feature points whose derivatives are smaller than a predetermined threshold value serve as points of an identical same semi-stability area. Then, the average of these feature points serves as a representative feature point of that semi-stability area. According to another selectable sorting method, vector distances between feature points are calculated, and feature points whose vector distances are smaller than a predetermined threshold value serve as points of an identical semi-stability area. Then, the average of these feature points serves as a representative feature point of that semi-stability area. Further, another selectable sorting method is performed by compression and combination of feature vector (point) frames indicated by continuously identical codebook vectors. This method will be fully described below.

Figure 4A:
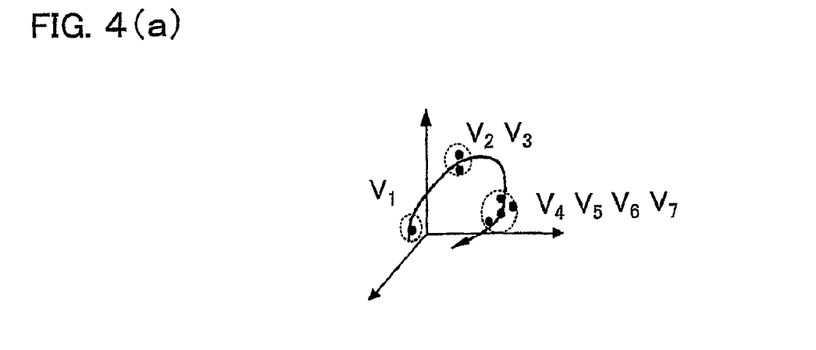
FIG. 4(a) is a diagram explaining a sequence of feature vectors of an input speech in a vector space.
Figure 4B:
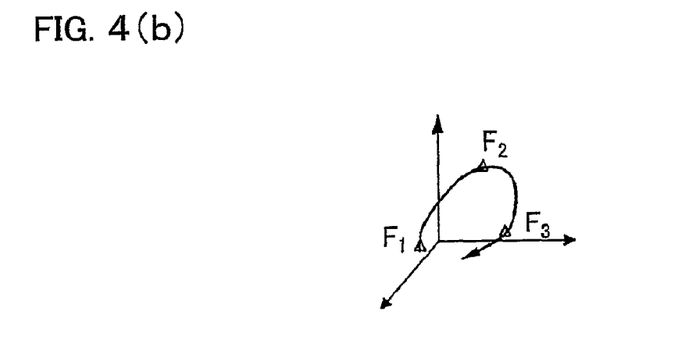
FIG. 4(b) is a diagram explaining a sequence of normalized feature vectors in the vector space.
Figure 4C:
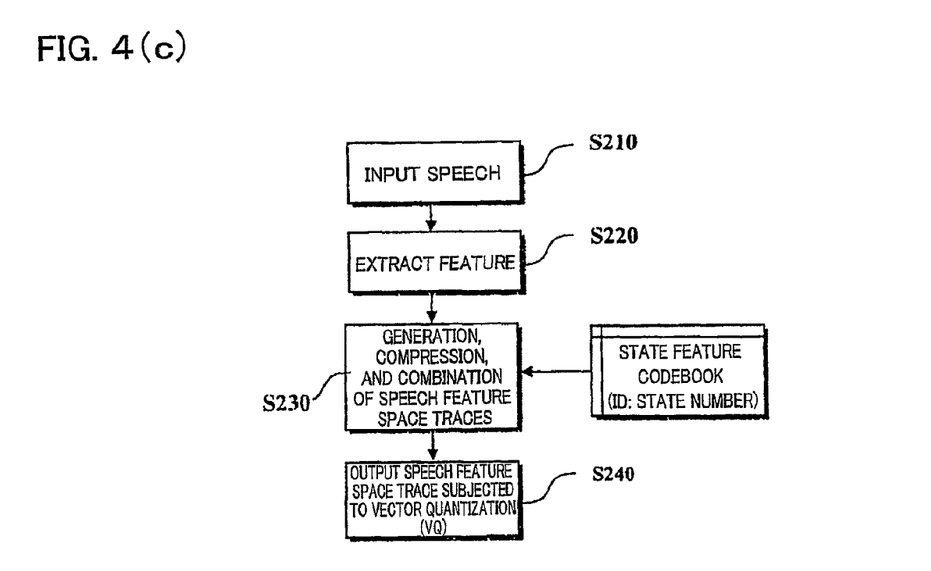
FIG. 4(c) is a flow chart showing a process of generating a speech feature space trace.

FIGS. 4(a) through 4(c) are diagrams explaining a process according to an embodiment of the present invention of generating a speech feature space trace (feature vector sequence). FIG. 4(a) is a diagram explaining a sequence of feature vectors of an input speech in a vector space. FIG. 4(b) is a diagram explaining a sequence of normalized feature vectors in the vector space. FIG. 4(c) is a flow chart showing a process of generating a speech feature space trace.

In the following, a process of generating a feature vector sequence in cases where feature vectors are compressed will be explained with reference to FIGS. 4(a) through 4(c). This method gives consideration to the foregoing points to which attention should be paid in the process of normalizing a speech trace, and normalizes an input speech with use of vector quantization based on the HMM acoustic model.

As shown in FIG. 4(c), a recognition target speech is inputted (S210). The speech inputted herein is defined as:

$$X_i(t) = (X_1(t), X_2(t), \ldots X_6(t), X_7(t))$$

(where i is a speech wave frame number)

Thereafter, an operation of extracting features from the input speech is carried out (S220). This yields feature vectors, corresponding in number to the features thus extracted, which are defined as:

$$V_i(t) = (V_1(t), V_2(t), \ldots V_6(t), V_7(t))$$

(where i is a speech wave frame number)

The normalizing section 30 refers to the state feature codebook thus generated, searches the codebook for codebook vectors best matched with the feature vectors, and indicates the feature vectors with use of ID numbers of the codebook vectors. Then, feature vectors indicated by continuously identical codebook vectors are compressed and combined (S230). The normalizing section 30 outputs a vector obtained by vector quantization (VQ) of the obtained speech feature space (S240). When k=3, FIG. 4(b) shows a feature vector defined as:

$$V_j(t) = (ID_1(t), ID_2(t), \ldots ID_{k-1}(t), ID_k(t))$$

(where j=1, 2, ..., k; $ID_j$ is a codebook vector number; and k is the total number of state feature vectors of the recognition target speech, and is usually smaller than the number of speech wave frames.)

Figure 5A:
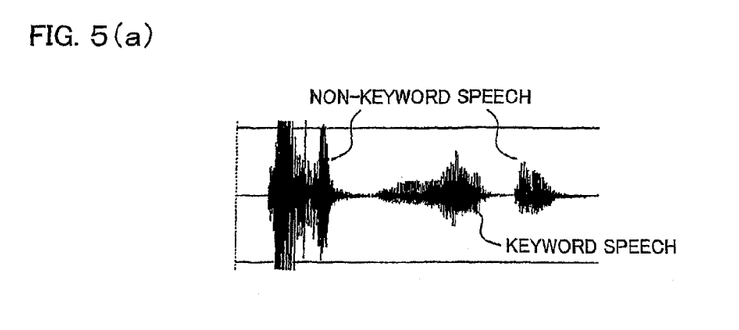
FIG. 5(a) is a diagram showing a speech waveform containing a keyword speech and a non-keyword speech.
Figure 5B:
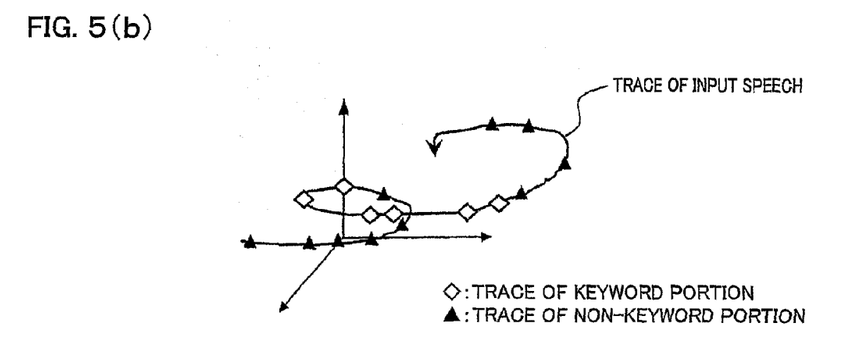
FIG. 5(b) is a diagram showing traces of keyword and non-keyword speeches in a vector space.
Figure 5C:
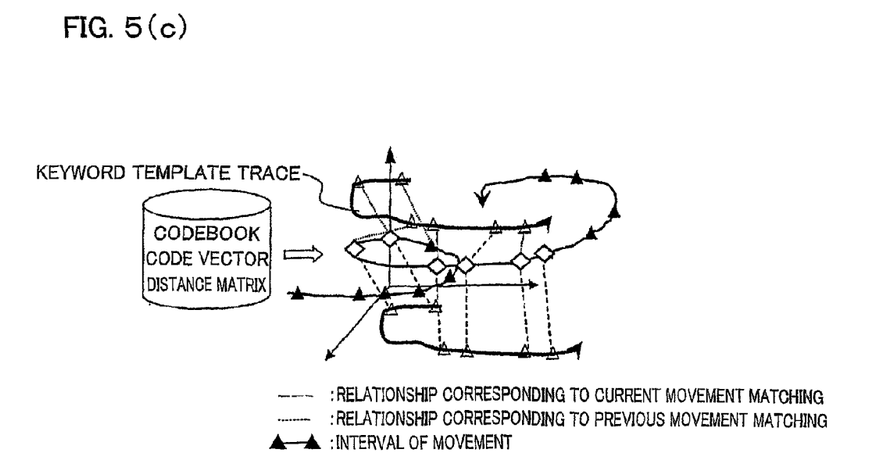
FIG. 5(c) is a diagram explaining a process of performing linear movement matching of a trace of a keyword template and a trace of an input speech.

FIGS. 5(a) through 5(c) are diagrams showing the principle of a process according to an embodiment of the present invention of locating a keyword in an input speech by speech feature space trace matching. FIG. 5(a) is a diagram showing a speech waveform containing a keyword speech and a non-keyword speech. FIG. 5(b) is a diagram showing traces of keyword and non-keyword speeches in a vector space. FIG. 5(c) is a diagram explaining a process of performing linear movement matching of a trace of a keyword template and a trace of an input speech.

Normally, as shown in FIG. 5(a), a keyword waveform is contained in a waveform of an input recognition target speech. As shown in FIG. 5(b), a trace of an input speech in a vector space is represented by a continuous curve. Found substantially in the middle of the curve is a trace of a keyword vector in the vector space.

As described above, in cases where a feature trace of an input speech is known, the feature trace of the input speech is matched with a keyword template trace by moving the keyword template trace along the feature trace of the input speech. At the same time, every time a speech wave frame contained in a time-axis signal corresponding to the feature trace is moved, i.e., every time a trace frame is moved, the distance between the traces is calculated by linear addition of distances between a feature point located on the template trace and the corresponding feature point of the recognition target speech. The distance represents a degree to which the template trace is similar to the space trace of the recognition target speech in this position. After completion of matching of the keyword template trace, a minimum distance is obtained with respect to the keyword template trace. Thereafter, by performing matching with respect to different keyword templates, minimum distances can be obtained with respect to the keyword templates. Finally, these minimum distances are searched for a minimum value, and a keyword corresponding to the minimum value serves as a candidate keyword. Moreover, the position in which the distance between the candidate keyword and the trace of the input speech is smallest is reflected on the time axis. This yields a frame number of a speech wave frame corresponding to the candidate keyword.

Figure 6A:
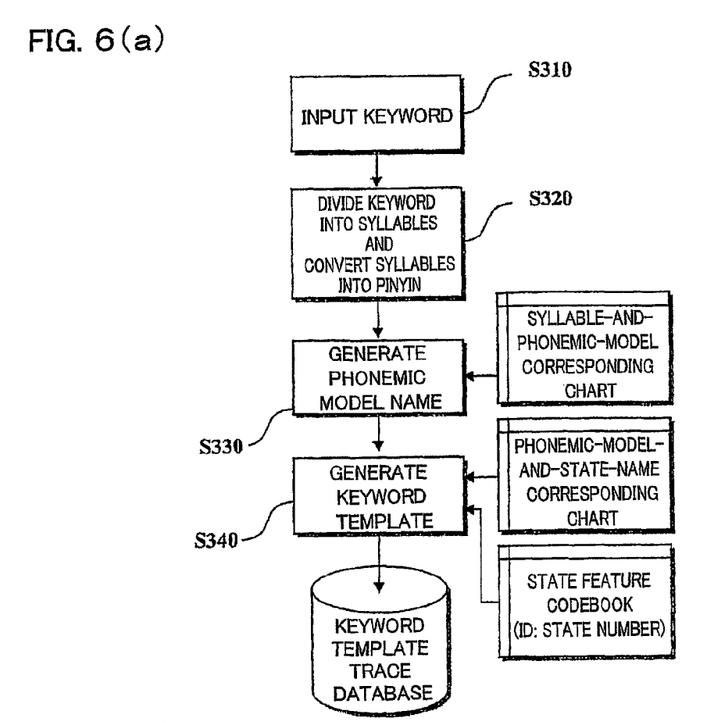
FIG. 6(a) is a flow chart showing a process of generating a keyword template.
Figure 6B:
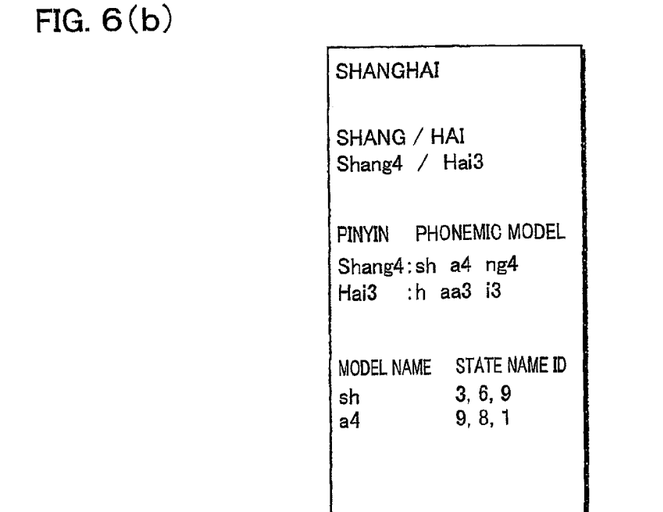
FIG. 6(b) shows a specific example of the process of generating a keyword template.

FIGS. 6(a) and 6(b) are diagrams explaining a process according to an embodiment of the present invention of generating a keyword template. FIG. 6(a) is a flow chart showing a process of generating a keyword template. FIG. 6(b) shows a specific example of the process of generating a keyword template.

A template can be inputted by two types of input method: speech input and text input. However, the present invention is not limited to these. A template may be inputted by another type of method. The following fully describes the text input and the speech input as examples.

(Text Input)

As shown in FIG. 6(a), a keyword text such as "Shanghai" is inputted (S310). Then, an operation of dividing the keyword text into syllables and an operation of converting the syllables into pinyin are carried out. For example, the keyword text "Shanghai" is divided into syllables "Shang" and "Hai", and the syllables "Shang" and "Hai" are converted into string expressions, i.e., into pinyin "shang4" and "hai3" (S320).

Then, with use of the syllable-and-phoneme-model corresponding chart, phonemes respectively indicated by shang4 and hai3 are obtained. That is, as shown in FIG. 6(b), the phonemic model names are "sh a4 ng4" and "h aa3 i3", respectively (S330).

After the phonemic names of the keyword are obtained, the phonemic names are used to search the phonemic-model-and-state-name corresponding chart for state names respectively corresponding to the phonemic model names. This yields a codebook vector number corresponding to each model constituting a phoneme (S340). As shown in FIG. 6(b), the keyword "Shanghai" has a codebook vector sequence of numbers "3,6,9,9,8,1, . . . ".

Then, these numbers are concatenated in the original order in which they were arranged in the keyword, and feature vector frames respectively indicated by continuously identical codebook vectors are compressed and combined. This yields a keyword template trace. As shown in FIG. 6(b), the template trace of the keyword "Shanghai" has a feature vector sequence of numbers "3,6,9,8,1, . . . ". Note that the two identical numbers "9" are compressed into a single number "9". Finally, the keyword template trace and the keyword are stored in the keyword template trace database 60 so as to be correlated with each other.

(Speech Input)

First, a keyword that has been input in a speech form, i.e., a speech waveform is divided into speech wave frames, and feature parameter vectors are extracted from the speech wave frames. This yields a feature parameter vector sequence that represents the speech waveform. In a vector space, the codebook is quantized with use of the aforementioned vectors, and each of the feature parameter vectors is normalized. This yields a feature vector sequence indicated by feature points (vectors). Similarly, an element of each of the feature vectors contained in the feature vector sequence is a state number.

Figure 7:
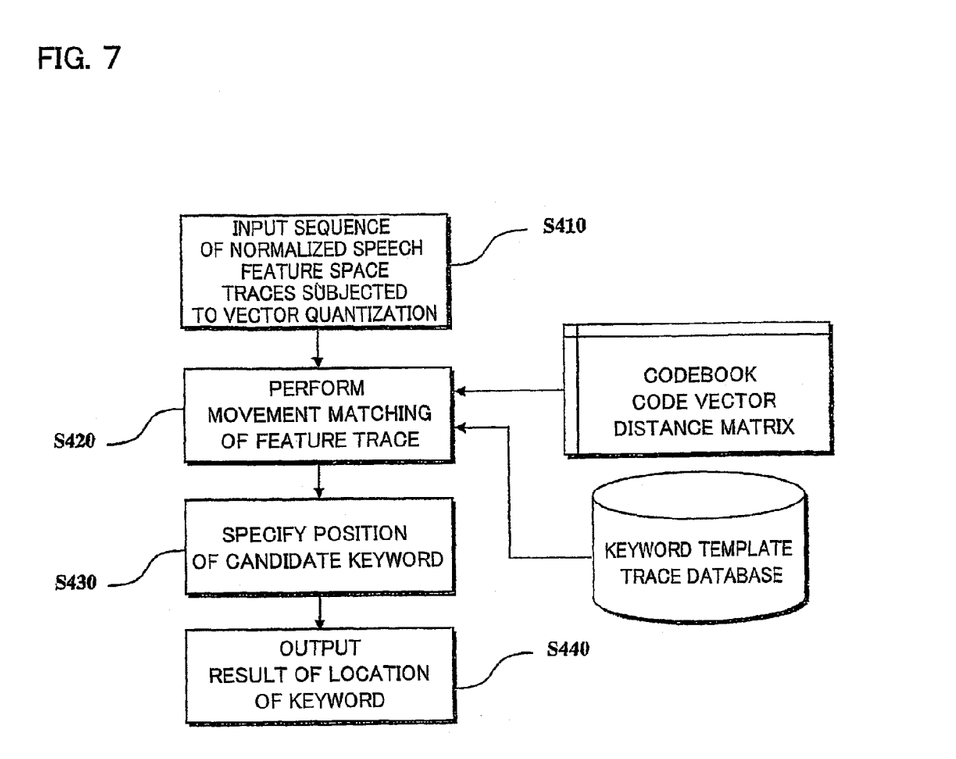
FIG. 7 is a diagram explaining a linear movement matching process according to an embodiment of the present invention.

FIG. 7 is a diagram explaining a trace movement matching process according to an embodiment of the present invention.

As shown in FIG. 7, the normalizing section 30 normalizes the recognition target speech according to a normalizing calculation method of HMM acoustic model vector quantization, thereby yielding a feature vector sequence $T'=\{T'_m\}$ (M=0,1, . . . , L) corresponding to the recognition target speech, where L is the total length of a trace of the recognition target speech (S410).

As described above, the template speeches w(w=1,2, . . . , W) have been normalized in advance. Further, the obtained normalization feature vector sequence $X'_w=\{X'_{n,w}\}$ (n=0,1, . . . , $L_w$) is stored in the keyword template trace database 60. Note that W is the total number of templates and $L_w$ is the total length of traces of the normalized templates w.

Then, the trace portion $S_{m,m+Lw}=\{T'_m,T'_{m+1}, \ldots, T'_{m+Lw}\} \in \{T'_m\}$ (m=0, 1, . . . , L-$L_w$) of the recognition target speech is linearly moved so as to be matched for each frame from the zeroth trace frame (m=0) of the feature vector sequence $\{T'_m\}$ of the recognition target speech to the end (m=L-$L_w$) of the matching of the recognition target speech. With use of the codebook vector distances stored in the codebook vector distance matrix, the matching distance $$D_{m,w} = \sum_n \text{MATRIX}(X'_{n,w}, T'_{m+n})(m = 0, 1, \ldots, L-L_w, n = 0, 1, \ldots L_w)$$

obtained every time a trace frame is moved is stored by addition. Thereafter, the minimum matching distances $D_{m^*,w}=\min(D_{m,w})(0 \leq m^* \leq (L-L_w))$ between the traces of the template speeches w and the trace of the recognition target speech are stored.

In cases where w<W, Step S420 is repeated with respect to the other keyword templates. In addition, a keyword $$w^* = \underset{1 \leq w \leq W}{\text{argmin}}(D_{m^*,w})$$

corresponding to the minimum value of the minimum distances $D_{m^*,w}$(w=0,1, . . . , W) of the templates is extracted; that is, a candidate keyword w* contained in the detected recognition target speech is extracted (S430). Then, the position m* of a feature point corresponding to w* is converted into a number of an original speech wave frame on the time axis. Thus, the detection is completed (S440).

Further, in the aforementioned embodiment, the matching distances are indicated with use of the sum of codebook vector distances. However, the present invention is not limited to this. For example, a person skilled in the art may indicate the matching distances with use of the sum of squares of codebook vector distances, the sum of roots of codebook vector distances, or the sum of norms of codebook vector distances.

As described above, after the matching section 70 has specified the position of a keyword, the speech recognition engine 80 uses feature parameters extracted by the feature extracting section 20 from a recognition target speech that is in the position of a candidate keyword already located, and further performs recognition, thereby yielding a final result of the recognition, i.e., yielding the content of the recognition. The resulting candidate keyword can be referred to in determining the content of a final keyword.

Further, the output section 90 outputs the content of a keyword in accordance with a result of the recognition performed by the speech recognition engine 80. For example, the output section 90 displays an identified keyword on a screen.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

Industrial Applicability

The present invention can improve the speed of location and recognition of a keyword contained in a speech and can simultaneously ensure the precision of recognition of a keyword contained in a speech, and therefore can be applied to a method and apparatus for locating a keyword contained in a speech, and to a speech recognition system.

The invention claimed is:

1. A method, carried out by use of a keyword locating apparatus for locating a keyword contained in a recognition target speech, comprising:
   by extracting feature parameters from frames constituting the recognition target speech, forming a feature parameter vector sequence that represents the recognition target speech;
   by normalizing of the feature parameter vector sequence with use of a codebook containing a plurality of codebook vectors, obtaining a feature trace of the recognition target speech in a vector space; and
   specifying the position of a keyword by matching prestored keyword template traces with the feature trace, wherein
   the normalizing step includes the step of obtaining the feature trace by extracting representative feature parameter vectors from the feature parameter vector sequence, and the step of extracting the representative feature parameter vectors includes the steps of:
　　searching the codebook for codebook vectors that are closest to the feature parameter vectors;
　　indicating the feature parameter vectors with use of numbers of the codebook vectors thus found; and
　　obtaining the feature trace by combining feature parameter vectors represented by continuously identical codebook vectors.

2. The method as set forth in claim 1, wherein the matching step includes the steps of:
　　by using each of the keyword template traces, sequentially calculating, with respect to each trace frame, distances between (i) template feature vectors that represent the keyword template trace and (ii) the representative feature parameter vectors that represent the feature trace, the trace frame representing the feature trace on a time axis;
　　specifying a minimum value of the distances; and
　　specifying, as the position of the keyword, a position that a keyword template trace corresponding to the minimum value occupies in the vector space.

3. The method as set forth in claim 2, wherein the feature parameter vectors include at least one parameter selected from the group consisting of a cepstral parameter, an energy value of the cepstral parameter, a first derivative of the cepstral parameter, a second derivative of the cepstral parameter, a first derivative of the energy value, and a second derivative of the energy value.

4. The method as set forth in claim 2, wherein each of the distances is represented with use of a codebook vector distance, the codebook vector distance being a distance between any two of the codebook vectors.

5. The method as set forth in claim 4, wherein the codebook vector distance is stored in advance in a matrix form.

6. A method, carried out by use of a keyword locating apparatus, for locating a keyword contained in a recognition target speech, comprising:
　　by extracting feature parameters from frames constituting the recognition target speech, forming a feature parameter vector sequence that represents the recognition target speech;
　　by normalizing of the feature parameter vector sequence with use of a codebook containing a plurality of codebook vectors, obtaining a feature trace of the recognition target speech in a vector space; and
　　specifying the position of a keyword by matching prestored keyword template traces with the feature trace, wherein the keyword template traces are generated in accordance with the codebook vectors.

7. The method as set forth in claim 6, wherein each of the keyword template traces is obtained by the steps of:
　　obtaining a phonemic name of each syllable of the keyword in accordance with correspondence between syllables and phonemic models;
　　obtaining each state of the keyword in accordance with correspondence between the phonemic models and states and forming a state vector;
　　obtaining a codebook vector sequence number of a phonemic model with use of a number corresponding to the state vector contained in the codebook;
　　combining codebook vector sequence numbers of phonemic models represented by continuously identical codebook vector numbers; and
　　obtaining the keyword template trace after concatenating the codebook vector sequence numbers.

8. The method as set forth in claim 6, wherein each of the keyword template traces is obtained by the steps of:
　　forming a parameter vector sequence of an input keyword by dividing a speech wave of the input keyword into speech wave frames and then by extracting feature parameter vectors from the speech wave frames; and
　　by using the codebook to normalize the feature parameter vector sequence, forming a template vector sequence that represents the keyword template trace.

9. The method as set forth in claim 2, wherein the codebook is obtained by the steps of:
　　extracting, from a phonetic model based on a hidden Markov model, statistical parameters that represent states of each phonemic model and then forming a feature vector of each of the states; and
　　forming each of the codebook vectors of the codebook by representing the feature vector of each of the states by number.

10. The method as set forth in claim 9, wherein the phonemic model is generated by a learning corpus of a plurality of application regions.

11. An apparatus for locating a keyword contained in a recognition target speech, comprising:
　　a feature extracting device configured to form, by extracting feature parameters from frames constituting the recognition target speech, a feature parameter vector sequence that represents the recognition target speech;
　　a normalizing device configured to obtain, by normalizing of the feature parameter vector sequence with use of a codebook containing a plurality of codebook vectors, a feature trace of the recognition target speech in a vector space; and
　　a matching device configured to specify the position of a keyword by matching prestored keyword template traces with the feature trace, wherein
　　the normalizing device obtains the feature trace by extracting representative feature parameter vectors from the feature parameter vector sequence, and
　　the normalizing device searches the codebook for codebook vectors that are closest to the feature parameter vectors, indicates the feature parameter vectors with use of numbers of the codebook vectors thus found, and obtains the feature trace by combining feature parameter vectors represented by continuously identical codebook vectors.

12. The apparatus as set forth in claim 11, wherein the matching device uses each of the keyword template traces to sequentially calculate, with respect to each trace frame, distances between (i) template feature vectors that represent the keyword template trace and (ii) the representative feature parameter vectors that represent the feature trace, the trace frame representing the feature trace on a time axis; specifies a minimum value of the distances; and specifies, as the position of the keyword, a position that a keyword template trace corresponding to the minimum value occupies in the vector space.

13. A speech recognition system comprising:
　　an apparatus as set forth in claim 11; and
　　a speech recognition device for recognizing the content of a keyword in accordance with the position of the keyword, the keyword being specified by the apparatus.

14. The speech recognition system as set forth in claim 13, wherein the speech recognition device performs recognition in accordance with a hidden Markov model.

* * * * *